United States Patent
Arai et al.

(10) Patent No.: US 7,580,397 B2
(45) Date of Patent: Aug. 25, 2009

(54) WIRELESS LAN COMMUNICATION SYSTEM, WIRELESS LAN CONNECTION METHOD, AND WIRELESS LAN TERMINAL APPARATUS

(75) Inventors: Takashi Arai, Tokyo (JP); Hitoshi Yamazaki, Tokyo (JP); Masashi Itou, Tokyo (JP)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 11/156,733

(22) Filed: Jun. 21, 2005

(65) Prior Publication Data

US 2006/0014537 A1   Jan. 19, 2006

(30) Foreign Application Priority Data

Jun. 22, 2004   (JP)   ............................. 2004-183626

(51) Int. Cl.
*H04W 4/00* (2006.01)
(52) U.S. Cl. .................................... 370/338; 455/435.3
(58) Field of Classification Search ................. 370/338, 370/331, 230, 400; 455/343.4, 574, 509, 455/512, 513, 436, 435.2, 435.3; 709/206
See application file for complete search history.

(56) References Cited

U.S. PATENT DOCUMENTS

| | | | |
|---|---|---|---|
| 5,627,882 A | 5/1997 | Chien et al. | |
| 6,002,918 A | 12/1999 | Heiman et al. | |
| 6,480,476 B1 * | 11/2002 | Willars | ........................ 370/311 |

(Continued)

FOREIGN PATENT DOCUMENTS

JP    8-316965    11/1996

(Continued)

OTHER PUBLICATIONS

LAN MAN Standards Committee of the IEEE Computer Society, ANSI/IEEE Std 802.11, 1999 Edition (R2003) Information technology- Telecommunications and information exchange between systems- Local and metropolitan area networks- Specific requirements- Part 11: Wireless LAN Medium Access Control (MAC) and Physical Layer (PHY) Specifications—ACM SIGCOMM Computer Communications Review vol. 33, No. 2.

(Continued)

*Primary Examiner*—George Eng
*Assistant Examiner*—Michael Faragalla
(74) *Attorney, Agent, or Firm*—Young & Thompson

(57) ABSTRACT

An object of the invention is to reduce the power consumption at the time of an automatic homing operation performed between a base station apparatus and a wireless LAN terminal apparatus. When an automatic homing operation is performed in which a scanning operation is repeated for searching an AP as a connection destination, the wireless LAN terminal apparatus 10 does not leave unchanged a scan pause time period which is a period of time between the previous scanning operation to the next scanning operation, but lengthens it as the number of scanning operations increases. More specifically, each time the scanning operation is repeated predetermined number n times, the wireless LAN terminal apparatus extends the scan pause time period by a given incremental value. The wireless LAN terminal apparatus has an upper limit value of the scan pause time period preliminarily set therein. Thus the scan pause time period is made not to exceed the upper limit value.

5 Claims, 5 Drawing Sheets

U.S. PATENT DOCUMENTS

| | | | |
|---|---|---|---|
| 6,999,799 B1 * | 2/2006 | Almassy | 455/574 |
| 7,280,517 B2 * | 10/2007 | Benveniste | 370/338 |
| 7,283,507 B2 * | 10/2007 | Buckley et al. | 370/338 |
| 7,313,111 B2 * | 12/2007 | Hietalahti et al. | 370/329 |
| 7,366,511 B2 * | 4/2008 | Jaakkola et al. | 455/435.2 |
| 2003/0221122 A1 * | 11/2003 | Hatori | 713/200 |
| 2005/0144237 A1 * | 6/2005 | Heredia et al. | 709/206 |

FOREIGN PATENT DOCUMENTS

| | | |
|---|---|---|
| JP | 10-190560 | 7/1998 |
| JP | 11-196027 | 7/1999 |
| JP | 2001-109978 A | 4/2001 |

OTHER PUBLICATIONS

Jeong, Moo Ryong et al., "Fast Active Scan for Measurement and Handoff" IEEE 802.11-03, May 2003.

Mishra A. et al., "An Empirical Analysis of the IEEE 802.11 MAC Layer Handoff Process", Computer Communication Review, Association for Computing Machinery, New York, U.S., vol. 33, No. 2, Apr. 2003, pp. 93-102.

* cited by examiner

F I G. 1
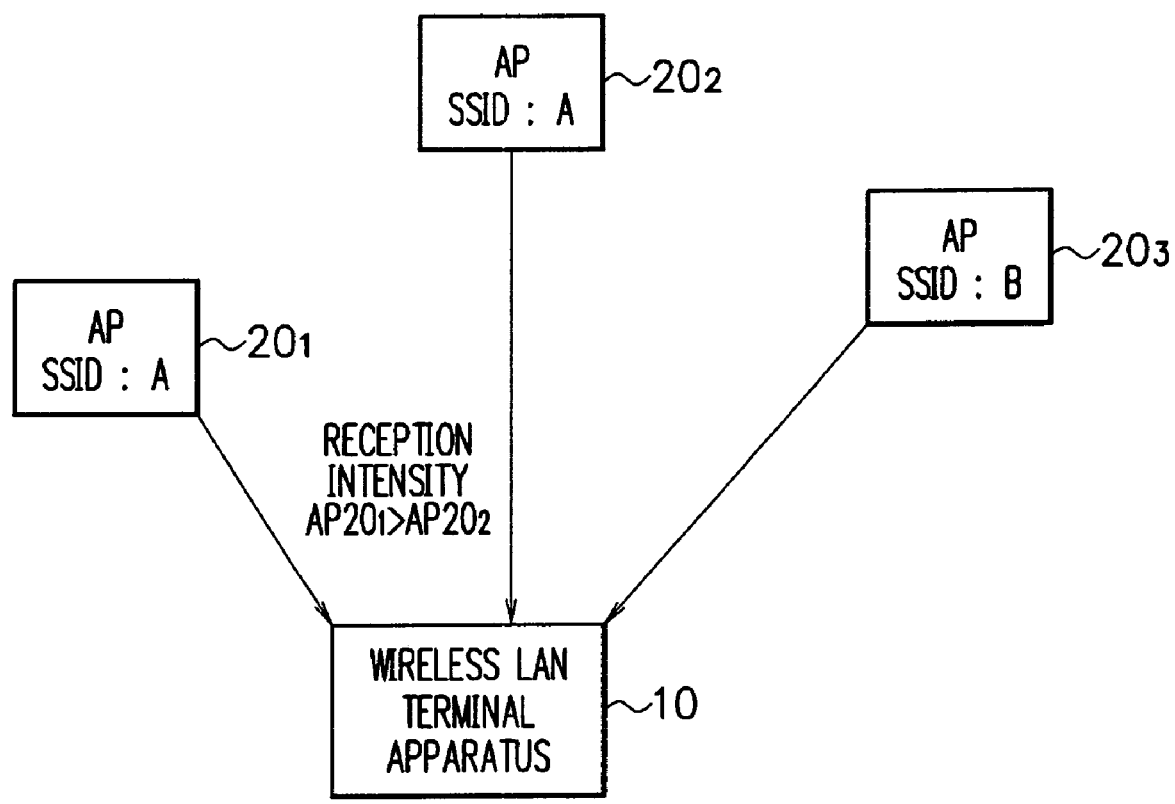

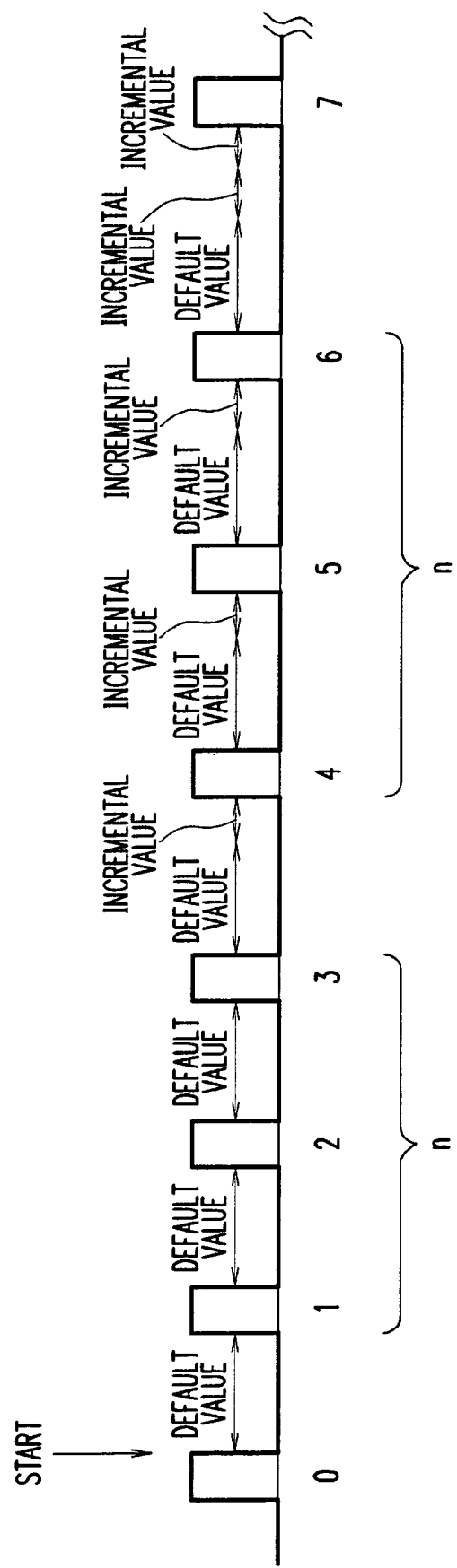

WIRELESS LAN COMMUNICATION SYSTEM, WIRELESS LAN CONNECTION METHOD, AND WIRELESS LAN TERMINAL APPARATUS

BACKGROUND OF THE INVENTION

1. Field of the Invention

The present invention relates to a wireless LAN communication system including a wireless LAN terminal apparatus having a wireless LAN (IEEE802. 11a/11g/11b) connection function and a base station apparatus making a wireless connection to the wireless LAN terminal apparatus to connect the terminal apparatus to the network, and more particularly to a wireless LAN connection method for establishing a connection between the wireless LAN terminal apparatus and the base station apparatus.

2. Description of Related Art

In recent years, hot spot services are attracting great attention which provides Internet-access by use of wireless LAN in a specific shop or the like. In addition, wireless LAN requiring no connection cable is also widely diffusing into households.

In such a wireless LAN communication system, in order to connect with the wireless LAN network, firstly the wireless LAN terminal apparatus has to search a connectable base station apparatus (hereinafter, referred to as an AP: Access Point) and wirelessly connect with the AP; as means for searching quickly a connectable AP, the wireless LAN terminal apparatus utilizes active scan. Active scan is an operation of a wireless LAN terminal apparatus searching a wireless LAN network existing around this terminal apparatus by sending a probe request to an AP and receiving a probe response returned from the AP. When the wireless LAN terminal apparatus cannot find any AP to be connected therewith even after performing active scan, an automatic homing operation will be performed in which scanning operation is repeated. However, when the automatic homing operation is performed, radio wave is continuously transmitted from the wireless LAN terminal apparatus, thereby causing a problem of increasing the power consumption of the wireless LAN terminal apparatus.

When used in varied places in the open air or within a household, such as a hot spot service area, wireless LAN terminal apparatuses are usually driven by battery. Accordingly, the operable time of a wireless LAN terminal apparatus is dependent on the capacity of battery. Thus, when automatic homing is performed by the wireless LAN terminal apparatus to increase its power consumption, the operable time is reduced. Consequently, with wireless LAN terminal apparatuses, the reduction of power consumption at the time of the automatic homing operation is desired.

As a technique of reducing the power consumption at the time of waiting in a wireless LAN terminal apparatus, there has been proposed one in which the reduction of power consumption is achieved by selecting alternately the time of waiting and that of reception at a given interval so as to perform the reception operation intermittently (refer to Japanese Patent Application Laid-Open No. 8-316965, Japanese Patent Application Laid-Open No. 10-190560, Japanese Patent Application Laid-Open No. 11-196027 and Japanese Patent Application Laid-Open No. 2001-109978, for example).

Such technique is also used in conventional wireless LAN communication systems; active scan is intermittently performed at the time of the automatic homing operation. However, in the case where active scan is simply performed intermittently at the same interval at the time of the automatic homing operation, even when there is no AP around the wireless LAN terminal apparatus, active scan will be repeated at the given interval, thus resulting in useless power consumption.

SUMMARY OF THE INVENTION

In the conventional wireless LAN communication systems described above, even when there is no AP around the wireless LAN terminal apparatus, an active scan is repeated at a given interval at the time of the automatic homing operation, thus resulting in useless power consumption.

Accordingly, an object of the present invention is to provide a wireless LAN communication system and a wireless LAN connection method which can reduce power consumption at the time of the automatic homing operation performed between a base station apparatus and a wireless LAN terminal apparatus.

To achieve the above object, according to the present invention, there is provided a wireless LAN connection method for a wireless LAN terminal apparatus searching a base station apparatus of a connection destination, wherein when an automatic homing operation is performed in which the wireless LAN terminal apparatus repeats a scanning operation to search the base station apparatus of a connection destination, a scan pause time period is lengthened as the number of scanning operations increases where the scan pause time period is defined as a period of time from the previous scanning operation to the next scanning operation.

According to the present invention, when the wireless LAN terminal apparatus cannot find any base station apparatus of a connection destination even after performing a scanning operation at the time of the automatic homing operation, then the scan pause time period being an interval until initiating the next scan is gradually lengthened. Consequently, when there is no base station apparatus to be connected therewith around the wireless LAN terminal apparatus, the number of scanning operations can be reduced so as to decrease power consumption.

The scan pause time period may be set so as not to exceed an upper limit value preliminarily set, or alternatively may be set so as to be increased each time the scanning operation is repeated a predetermined number of times.

According to the present invention, by setting an upper limit value with respect to the scan pause time period, the scan pause time period is made not to exceed the upper limit value. Thus, such a case can be avoided where the scan pause time period is excessively lengthened, thereby causing a delay in finding a base station apparatus to be connected therewith. Also, by increasing the scan pause time period each time the scanning operation is repeated a predetermined number of times, it is possible to increase gradually the scan pause time period.

Also, the wireless LAN terminal apparatus may have set therein multiple base station apparatuses with priority set thereon which have permission to make a wireless LAN connection, whereby the wireless LAN terminal apparatus selects a base station apparatus to be connected therewith based on the set priority.

According to the present invention, by setting multiple base station apparatuses with priority set thereon which are connectable with a wireless LAN terminal apparatus, it is possible to find a base station apparatus to be connected therewith more quickly than when only one base station apparatus is set in the wireless LAN terminal apparatus, minimizing the scanning operation for searching the base station apparatus of a connection destination and thereby achieving the reduction of power consumption.

As described above, according to the present invention, the wireless LAN terminal apparatus extends gradually the scan pause time period being an interval until initiating the next scan. Accordingly, when there is no base station apparatus to be connected therewith around the wireless LAN terminal apparatus, the number of scanning operations can be reduced, thus the power consumption is decreased.

BRIEF DESCRIPTION OF THE DRAWINGS

The objects and features of the present invention will become more apparent from the consideration of the following detailed description taken in conjunction with the accompanying drawings, in which:

FIG. 1 is a block diagram showing a configuration of a wireless LAN communication system according to an embodiment of the present invention;

FIG. 5 is a diagram showing the process of an automatic homing operation when n=3.

DESCRIPTION OF THE PREFERRED EMBODIMENTS

An embodiment of the present invention will now be described in detail with reference to the accompanying drawings. FIG. 1 is a block diagram showing a configuration of a wireless LAN communication system according to an embodiment of the present invention.

The wireless LAN communication system of the present embodiment shown in FIG. 1 includes a wireless LAN terminal apparatus 10 and three base station apparatuses (AP) $20_1$ to $20_3$.

When an automatic homing operation is performed in which scanning operation is repeated for searching a connection destination AP, the wireless LAN terminal apparatus 10 does not leave unchanged a scan pause time period which is a period of time from the previous scanning operation to the next scanning operation, but lengthens the scan pause time period as the number of scanning operations increases. More specifically, each time the scanning operation is repeated predetermined number n times, the wireless LAN terminal apparatus extends the scan pause time period by a given incremental value. The wireless LAN terminal apparatus has an upper limit value of the scan pause time period preliminarily set therein; the scan pause time period is made not to exceed the upper limit value.

The wireless LAN terminal apparatus 10 has an AP preliminarily set therein which has an SSID (Service Set Identifier) assigned thereto and thereby has permission to establish a wireless LAN connection. When multiple APs having permission for a wireless LAN connection are set, priority is assigned to the APs in order to determine whether to establish a connection with the Aps; the wireless LAN terminal apparatus selects an AP to be connected therewith based on the assigned priority.

The operation of the wireless LAN communication system of the present embodiment will now be described in detail with reference to the accompanying drawings.

Figure 2:
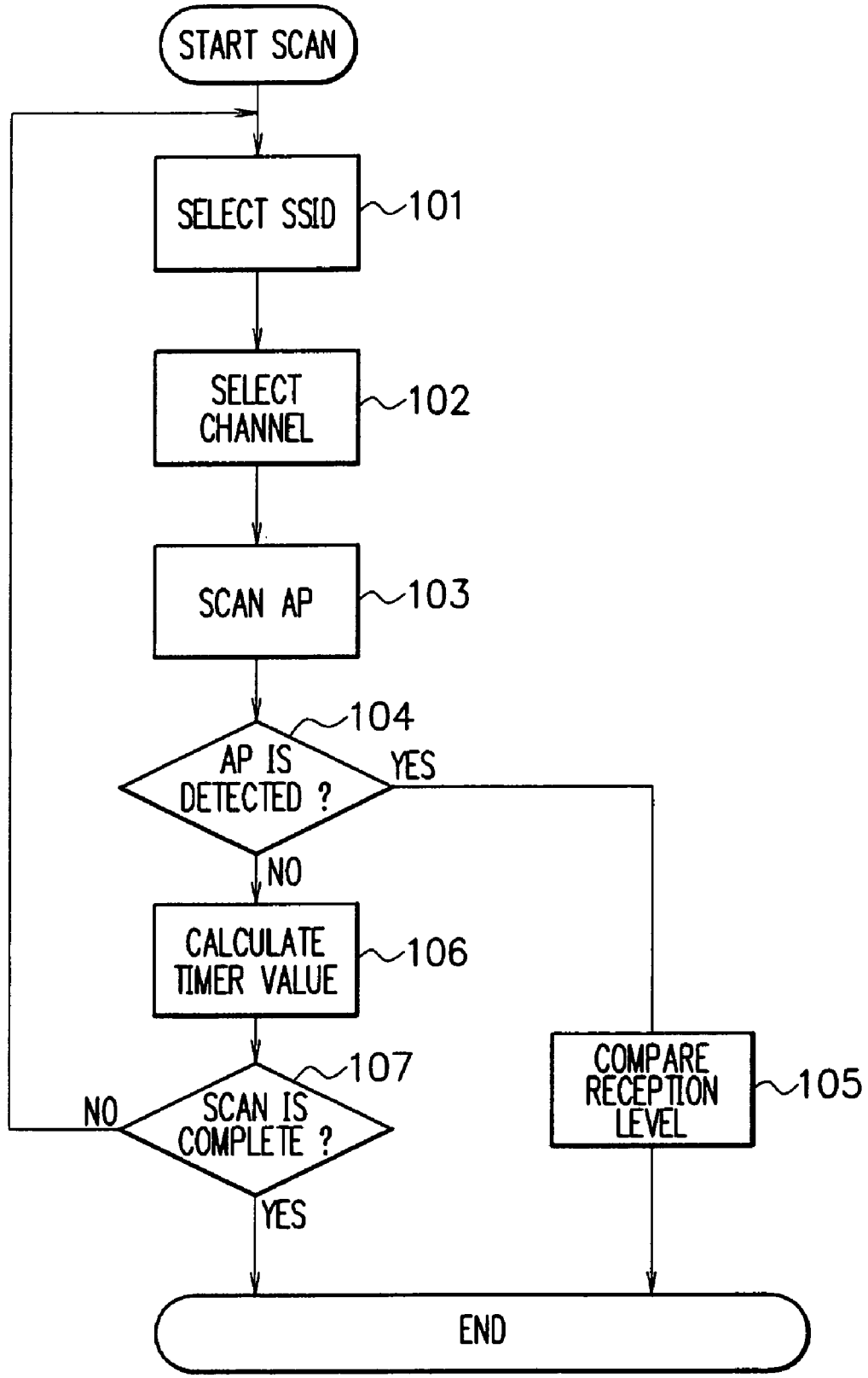
FIG. 2 is a flowchart showing the operation of the wireless LAN communication system of FIG. 1.

The operation of the wireless LAN terminal apparatus 10 of the present embodiment performing an automatic homing operation is shown in a flowchart of FIG. 2.

Firstly the SSID (Service Set Identifier) registered to a homing destination AP for setting a homing destination is set in the wireless LAN terminal apparatus 10 (step 101).

When a connection is established with a hot spot, the SSID is not specified and "ANY" is designated. When multiple APs are specified, priority is set. If there exist APs having the same SSID, the AP that receives higher radio field intensity is given priority.

Subsequently, channel selection is performed for selecting a channel used in scanning APs 201 to 203 (step 102). This is because there exist multiple channels in a wireless LAN and thus channel selection is needed to determine which channel to use in the scanning operation. As specific methods of channel selection, such method as individual-channel specification and all-channel specification (Auto) can be selected. Individual-channel specification is a method in which scanning is performed only to the specified channel; all-channel specification is a method in which scanning is performed automatically with respect to all existing channels.

Then, an AP scanning based on a probe request is performed with respect to the specified SSID and channel (step 103). In this step of AP scanning, the wireless LAN terminal apparatus 10 sends a probe request to APs 201 to 203 and then receives a probe response returned from APs 201 to 203 to confirm whether or not it is the AP to be searched. In sending this probe request, the wireless LAN terminal apparatus 10 repeats the sending three times to the specified SSID. If at least one probe response corresponding to the probe requests thus sent is received, then it is determined that the AP is properly detected. If a probe response cannot be received while a predetermined time period, then a probe request is sent to the subsequent SSID according to priority in the preliminarily registered AP list. This process is repeated based on the registered list.

Then, if an AP is detected in the AP scanning of step 103, it is determined based on the probe response returned in response to the sent probe request whether or not the detected AP coincides with the specified condition (step 104).

In step 104, if multiple APs that coincide with the condition are detected, an AP having higher priority of an SSID is selected; if multiple APs having the identical SSID are detected, levels of radio field intensity are compared among the detected APs to select one having a higher reception level of radio field intensity (step 105).

If no AP coincide with the condition in step 104, a timer value calculation is performed for setting an interval until the next scan is performed (step 106). The timer value calculation process will be described later in detail and a specific description is omitted here.

After the timer value calculation process, it is determined whether scanning has been performed to all the previously specified SSIDs and the APs of the previously selected channels (step 107). If it is determined in step 107 that all the scanning operations are complete, the process is terminated; if not, the homing operation returns to step 101 to repeat the scanning operation.

Figure 3:
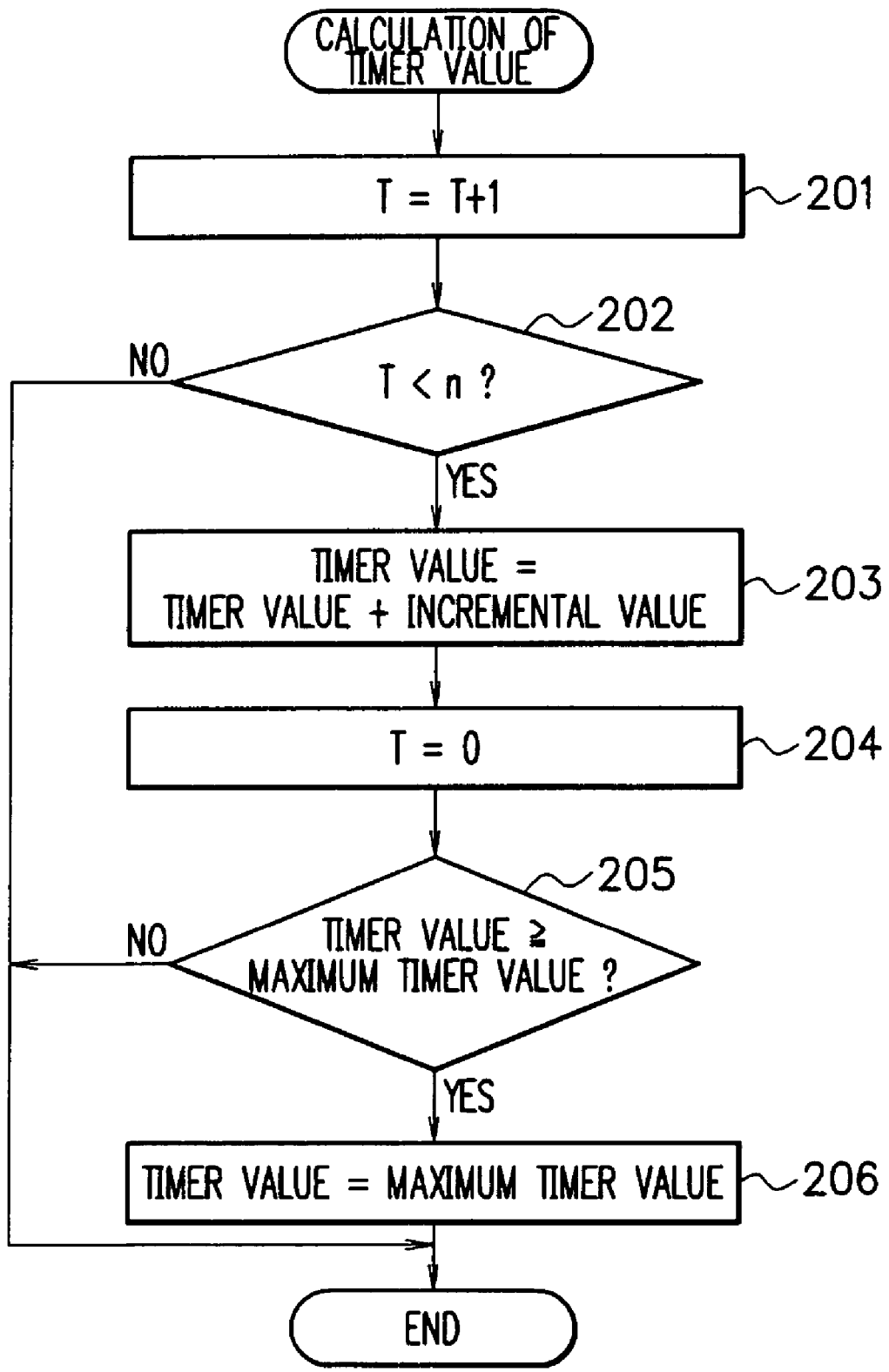
FIG. 3 is a flowchart showing the details of the timer value calculation process (step 106) shown in FIG. 2.

The details of the timer value calculation process of step 106 shown in FIG. 2 will now be described with reference to a flowchart of FIG. 3.

Firstly a value "1" is added to a value T for counting the number of scanning operations of the same interval, because the scan has been once performed at step 103 (step 201). It is assumed that the initial value of the value T is set to 0.

Then it is determined in the wireless LAN terminal apparatus 10 whether or not the value T is larger than n (step 202). If the value T is smaller than n, the timer value is incremented by a predetermined value (step 203). Then, the value T is set to 0 (step 204).

If the timer value is equal to or larger than the maximum timer value (step 205), then the timer value is reset to the maximum timer value (step 206). This process prevents the timer value from becoming larger than the maximum timer value, whereby the scan pause time period will not exceeds the upper limit value.

The timer value of the scan timer is set in this way. Consequently, next time the AP scanning of step 103 is performed, the following scanning process is initiated after this scan timer expires. Specifically, each time the scanning process is completed, the reset and the start of the scan timer are repeated; the scan pause time period being the interval between two successive scanning processes is provided by the timer value.

When a scanning process having the same scan pause time period is repeated n times (n ranges from 0 to a preset value), the timer value of the scan timer is incremented (the incremental value is settable) as indicated in step 203. When the timer value of the scan timer reaches the maximum value (settable) as indicated in step 205, the probe requests are transmitted at this same interval. It is noted that when n=0, the scanning process is performed with an initially set timer value (default value).

For example, when scan timer's default value is set to 6 seconds, the incremental value is set to 2 seconds for the first twelve operations and set to 30 seconds for the thirteenth or later operation, and the upper limit value is set to 600 seconds, then the scan pause time period being the interval between the previous scanning operation and the next scanning operation changes from 6 seconds to 8 seconds to 10 seconds, . . . to 30 seconds to 60 seconds to 90 seconds, . . . to 600 seconds, and is finally fixed at 600 seconds. Consequently, with the wireless LAN connection method of the present embodiment, when there is no AP to be connected therewith around the particular wireless LAN terminal apparatus, the scan pause time period becomes 600 seconds. Accordingly, the power consumption can be reduced to one hundredth relative to when the scan pause time period is fixed at 6 seconds.

Figure 4:
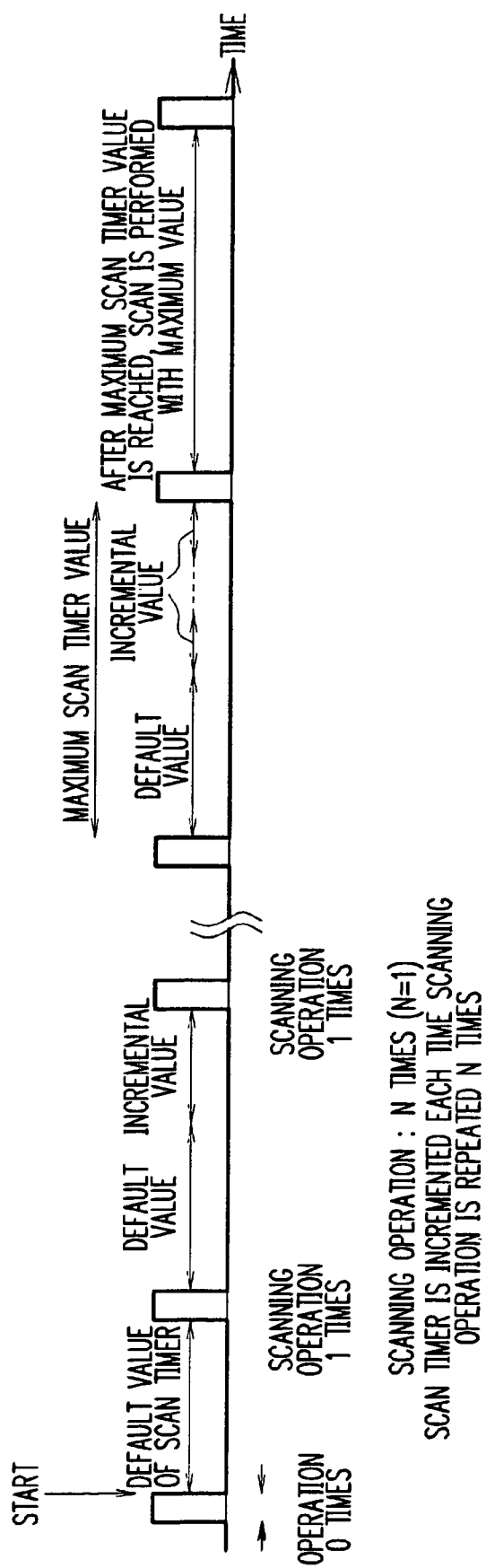
FIG. 4 is a diagram showing the process of an automatic homing operation when n=1.

The process of automatic homing operation when n=1 is shown in FIG. 4. Referring to FIG. 4, since n is set to 1 in the wireless LAN terminal apparatus 10, the scan pause time period is incremented by a prescribed value from the default value each time the scanning operation is once performed. Then, after the scan timer reaches the maximum value, the scanning operation is performed with the maximum value.

The process of automatic homing operation when n=3 is shown in FIG. 5. Referring to FIG. 5, since n is set to 3 in the wireless LAN terminal apparatus 10, the scan pause time period is incremented by a prescribed value from the default value each time the scanning operation is performed three times. Then, after the scan timer reaches the maximum value, the scanning operation is performed with the maximum value.

As described above, with the wireless LAN connection method of the present embodiment, the scanning operation is performed at a shorter interval immediately after the scanning operation is initiated. However, when no AP to be connected therewith is found, the scan pause time period being the interval between two successive scanning operations is gradually lengthened. Accordingly, in such a case where the wireless LAN terminal apparatus moves in an area where it is expected that no AP to be connected therewith is found, the interval of scanning operation is lengthened up to the prescribed upper limit value, thus making it possible to avoid useless power consumption.

The operation for a case where multiple APs to be connected therewith are registered in the wireless LAN terminal apparatus 10 will now be described. In FIG. 1, assume that SSID (Service Set Identifier) being "A" is set in APs. 201 and 202, and SSID being "B" in AP203. Also, assume that AP201>AP202 for received radio field intensity at the wireless LAN terminal apparatus 10.

For example, when "A" and "B" are set as the SSID of AP to be connected therewith in the wireless LAN terminal apparatus 10, and the first priority is given to an AP with SSID "B", and the second priority to APs with SSID "A", then AP 203 with SSID "B" is selected according to priority. Also, since the radio field intensity with respect to APs 201 and 202 with SSID "A" is such that AP201>AP202, the selection order of APs in the automatic homing operation is such that AP203, AP201, AP202.

Alternatively, for example, when "ANY" is set as the SSID of AP to be connected therewith (in this case, SSID is not specified), AP to be connected therewith will be determined only by radio field intensity without referring to SSID. Accordingly, the selection order of AP in the automatic homing operation is such that AP201, AP202, AP203.

When multiple APs possess priority and are registered in the wireless LAN terminal apparatus 10 in this way, then even when a connection with an AP cannot be maintained, a subsequent AP can be connected, whereby useless scanning operation is avoided, thus making it possible to reduce transmission power. Also, the probability of finding an AP to be connected therewith will rise. Consequently, power consumption associated with the automatic homing operation can also be avoided.

In the present embodiment, there is described the case where a wireless connection is made between a wireless LAN terminal apparatus and APs. The present invention is, however, not limited thereto; the present invention can also be similarly applied to a mobile wireless communication system, such as a mobile telephone system, where a wireless connection is made between a mobile terminal and a base station apparatus.

What is claimed is:

1. A wireless LAN connection method for a wireless LAN terminal apparatus searching a base station apparatus of a connection destination comprising, performing an automatic homing operation in which the wireless LAN terminal apparatus repeats a scanning operation wherein the wireless LAN terminal apparatus transmits a probe request to homing destination access points to attempt to find one of the homing destination access points that answers the probe request with a probe response received by the wireless LAN terminal apparatus and is the base station apparatus of connection destination;

lengthening a scan pause time period as the number of scanning operations increases where the scan pause time period is defined as a period of time from the previous scanning operation to the next scanning operation;

when service set identifiers (SSIDs) and priorities are specified for the homing destination access points, establishing a selection order of the homing destination access points that answer the probe request with SSIDs indicating that they are the base station apparatus of a connection destination by first selecting the homing destination access point having the highest priority and second, when the priorities of the homing destination access points are the same, selecting the homing destination access point with a highest radio field intensity; and when SSIDs are not specified for the homing destination access points, establishing a selection order of the homing destination access points that answer the probe request by selecting the homing destination access point with the highest radio field intensity.

2. The wireless LAN connection method according to claim 1, wherein the scan pause time period is set so as not to exceed an upper limit value preliminarily set.

3. The wireless LAN connection method according to claim 1, wherein the scan pause time period is set so as to be increased each time the scanning operation is repeated a predetermined number of times.

4. A wireless LAN communication system comprising:
   the wireless LAN terminal apparatus according to claim 1; and
   a base station apparatus making a wireless connection to the wireless LAN terminal apparatus to connect the wireless LAN terminal apparatus to a network.

5. The wireless LAN connection method of claim 1, wherein the scan pause time period is unrelated to timing of transmissions from the homing destination access points.

* * * * *

UNITED STATES PATENT AND TRADEMARK OFFICE
CERTIFICATE OF CORRECTION

PATENT NO. : 7,580,397 B2 Page 1 of 1
APPLICATION NO. : 11/156733
DATED : August 25, 2009
INVENTOR(S) : Arai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this

Fourteenth Day of September, 2010

David J. Kappos
*Director of the United States Patent and Trademark Office*